United States Patent [19]

Meades, Jr. et al.

[11] Patent Number: 4,902,945
[45] Date of Patent: Feb. 20, 1990

[54] ELECTRICAL CONTROL FOR HYDRAULIC VALVES

[76] Inventors: Flavious J. Meades, Jr., 309 Fairview Dr.; Flavious J. Meades, III, 2112 Cartier Dr., both of LaPlace, LA. 70068

[21] Appl. No.: 156,472

[22] Filed: Feb. 16, 1988

[51] Int. Cl.$^4$ .............................................. F16K 31/04
[52] U.S. Cl. ................................... 318/467; 318/266; 251/129.01; 251/129.04
[58] Field of Search ............... 318/466, 467, 468, 266; 251/129.11, 129.12, 129.13, 129.01, 129.02, 129.04, 129.05

[56] References Cited

U.S. PATENT DOCUMENTS

| | | | |
|---|---|---|---|
| 2,662,547 | 12/1953 | Comeau | 137/468 |
| 3,196,900 | 7/1965 | Catheron et al. | 251/129.11 X |
| 3,199,012 | 8/1965 | Harris | 318/466 |
| 3,258,985 | 7/1966 | Jordan | 251/129.12 |
| 3,394,292 | 7/1968 | Flum | 318/468 X |
| 3,808,484 | 4/1974 | Trotta | 318/467 |
| 3,914,676 | 10/1975 | Madonian et al. | 251/129.12 X |
| 4,097,786 | 6/1978 | Lund | 251/129.11 X |
| 4,429,705 | 2/1984 | Ritchart | 318/467 X |
| 4,455,012 | 6/1984 | Gupta | 318/469 X |
| 4,538,789 | 9/1985 | An | 251/129.12 |
| 4,556,832 | 12/1985 | Rollins | 318/467 |
| 4,611,617 | 9/1986 | Hewitt | 251/129.12 |
| 4,621,789 | 11/1986 | Fukamachi | 251/129.12 |
| 4,624,280 | 11/1986 | DePirro | 251/129.12 X |
| 4,694,390 | 9/1987 | Lee | 251/129.01 X |
| 4,816,987 | 3/1989 | Brooks et al. | 251/129.01 X |

FOREIGN PATENT DOCUMENTS

0650705 10/1962 Canada ........................... 251/129.12

*Primary Examiner*—Bentsu Ro
*Attorney, Agent, or Firm*—Pravel, Gambrell, Hewitt, Kimball & Krieger

[57] ABSTRACT

A variable electric control controls hydraulic speed control valves. The control includes a reversible DC electric motor coupled to a speed control valve, a detection circuit for detecting the degree to which the valve is opened, and indicator lights for indicating that degree. Electrical limit switches automatically shut off the motor as the valve fully opens or fully closes. A dual-pole, dual-throw actuator switch located at a position remote from the valve controls the electric motor. The indicator lights are located near the actuator switch. The detection circuit, the motor, and the coupling between the valve and the motor are preferably sized and arranged to be positioned on the housing of the valve and, when so positioned, to not extend, in plan, beyond the housing.

11 Claims, 5 Drawing Sheets

ELECTRICAL CONTROL FOR HYDRAULIC VALVES

BACKGROUND OF THE INVENTION:

1. Field of the Invention

The present invention relates to control mechanisms, and more particularly to control mechanisms for hydraulic valves.

2. General Background

Hydraulic speed control valves are used in heavy machinery such as cranes, bulldozers, and dredges to control hydraulic flow in the heavy machinery. Hydraulic speed control valves are located between a hydraulic pump and a four-way, three position control valve. The hydraulic flow drives a unit in the heavy machinery which is being operated. The four-way, three position valve determines whether the unit will be driven forward, in reverse, or not driven at all. Hydraulic speed control valves are presently controlled by Morse control cables. A Morse control cable comprises an inner cable which is disposed within a co-axial cylindrical housing and which may be pushed and pulled. The inner cables often rust to the point where they are rendered inoperative. Also, Morse control cables are not good for long distances, since it is difficult to push the inner cable very far. Maintenance of these cables is a source of inconvenience and expense for heavy machinery operators.

Various controls have been proposed for valves.

Comeau (U.S. Pat. No. 2,662,547) discloses flow control apparatus for automatically controlling flow of air to the cabin.

Jordan (U.S. Pat. No. 3,258,985) discloses an electric control apparatus for a valve activator which moves the valve between two preselected positions.

Gupta (U.S. Pat. No. 4,455,012) discloses an electric control capable of moving a valve between two positions.

An (U.S. Pat. No. 4,538,789) discloses an actuator for moving a valve between an open and a closed position.

Rollins (U.S. Pat. No. 4,556,832) discloses electrical apparatus for moving a valve between three positions.

Hewitt (U.S. Pat. No. 4,611,617) discloses an electrical apparatus for moving a valve between an open and a closed position.

Fukamachi (U.S. Pat. No. 4,621,789) discloses an electrical apparatus for moving a valve between an open and a closed position.

DePirro (U.S. Pat. No. 4,624,280) discloses a system for automatically opening and closing a gate valve in response to the rising or falling of fluid level in a pipe.

None of these patents discloses apparatus for electrically controlling a hydraulic speed control valve from a position remote from the speed control valve.

SUMMARY OF THE PRESENT INVENTION

The present invention comprises an electrical control for hydraulic speed control valves. The control comprises an electric motor means which can be actuated from a position remote from the hydraulic speed control valve being controlled. Means are provided to detect and indicate the degree to which the speed control valve is opened. The electric motor means is preferably coupled to the side lever spool of the hydraulic speed control valve being controlled with a coupling means comprising low-speed, high-torque reduction gears to enable the motor to work under very high pressures.

The detecting means preferably comprises a plurality of detector contacts which are selectively contacted by a ground contact. The indicating means preferably comprises a plurality of lights which are coupled to the detector contacts and which illuminate when their respective detector contacts are electrically contacted by the ground contacts. The actuating means for the electric motor means and the indicating means are preferably located at a position remote from the valve being controlled.

Limit means are preferably provided for automatically controlling the maximum and minimum degrees to which the valve can be opened.

It is an object of the present invention to provide an electric control for hydraulic speed control valves to allow a valve to be controlled from a location remote from the valve.

It is another object of the present invention to provide indicating means for indicating, at a position remote from the valve, the degree to which the valve is opened.

It is the further object of the present invention to provide an electric control for hydraulic speed control valves including means for automatically controlling the maximum and minimum degrees to which a valve can be opened.

BRIEF DESCRIPTION OF THE DRAWINGS

For a further understanding of the nature, objects, and advantages of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 9:
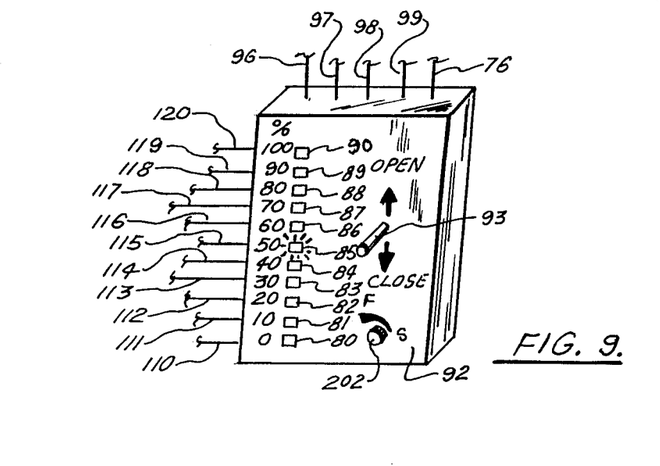
FIG. 9 is a perspective view of the control panel of the apparatus of the preferred embodiment of the present invention.
Figure 10:
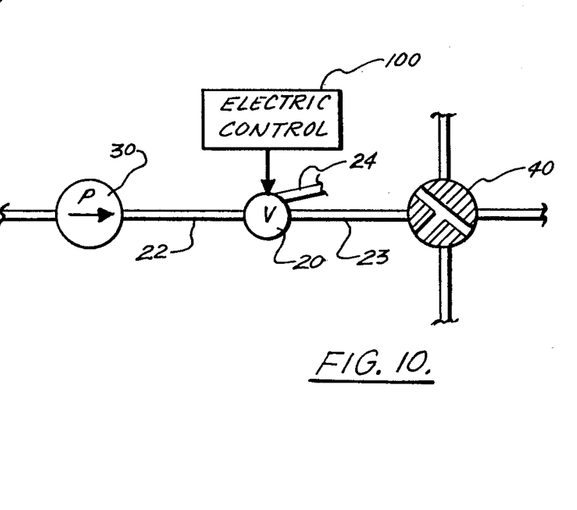
FIG. 10 is a schematic diagram showing the placement of the apparatus of the present invention in a hydraulic line.

Variable electrical control 100 is shown schematically in FIG. 10. Various views and details of the preferred embodiment of the apparatus of the present invention are shown in FIGS. 1–9.

The hydraulic speed control valve 20 being controlled by the apparatus 100 of the present invention is shown in FIGS. 1–4 and 10. Valve 20 may comprise any suitable hydraulic speed control valve, such as the FCR-51 Full Range Flow Control Valve manufactured by Brand Hydraulics Co., Inc. of Omaha, Nebr. Valve 20 comprises a housing 21 having an inlet port, controlled flow port, and an excess flow port, to which are connected, respectively, inlet flow line 22, controlled flow line 23, and excess flow line 24. As shown in FIG. 10, hydraulic speed control valve 20 is positioned in a hydraulic line between a pump 30 and a four-way, three position valve 40.

Figure 1:
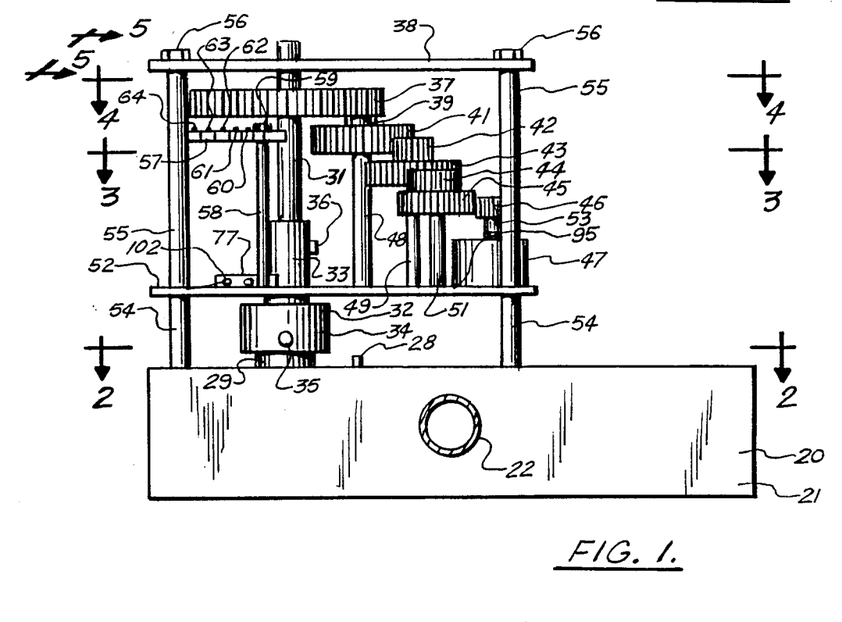
FIG. 1 is a side view of a hydraulic speed control valve with the preferred embodiment of the present invention mounted thereon.
Figure 2:
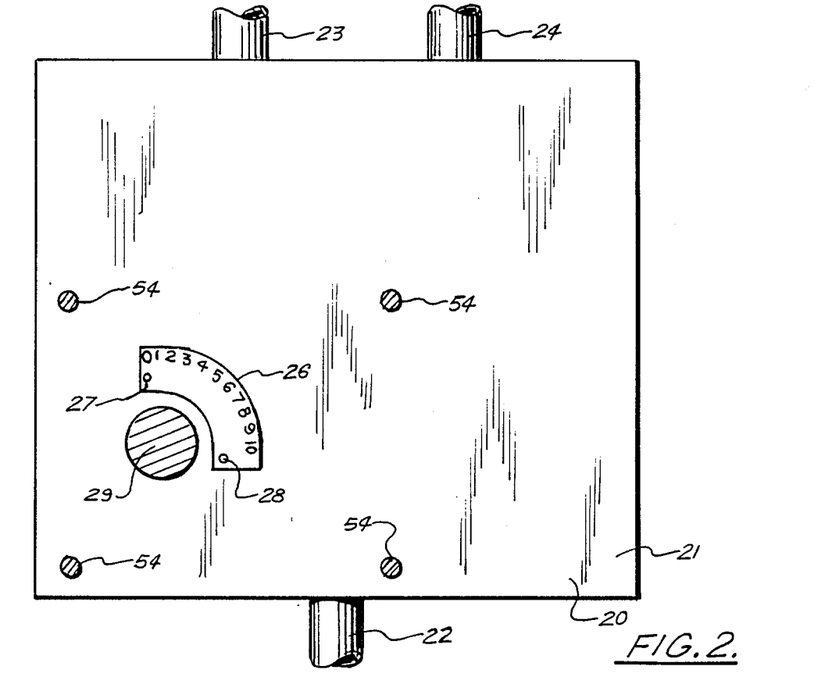
FIG. 2 is a plan view of the apparatus of the present invention taken along lines 2—2 in FIG. 1.

Valve 20 also comprises a side lever spool 29 (FIGS. 1 and 2). In valve 20 the lever which is normally connected to side lever spool 29 is omitted to allow valve 20 to be controlled by the apparatus 100 of the present invention, as will be described further. Valve 20 also comprises an indicator plate 26 (FIG. 2) with numbers thereon to, when a standard side lever spool with a lever therein is disposed in valve 20, indicate the degree to which valve 20 is opened. Stops 27 and 28 are present on indicator plate 26 to stop movement of a standard side lever spool past the fully closed and fully open positions, respectively, by stopping movement of a lever therein. Indicator plate 26 and stops 27 and 28 may be omitted if a hydraulic speed control valve is manufactured especially for use with apparatus 100.

Side lever spool 29 is linked to main drive gear shaft 31 with a connection coupling 32 (FIG. 1) having an upper, relatively small diameter portion 33 and a lower, relatively large diameter portion 34. A pin 35 passes through lower portion 34 and the hole (not shown) inside lever spool 29 in which a handle is normally disposed. Pin 35 fixes connection coupling 32 to side lever spool 29, and may comprise, for example, a nut and a bolt. A pin 36 passes through upper portion 33 and a bore hole (not shown) in main drive gear shaft 31. Pin 36 fixes connection coupling 32 to shaft 31, and may comprise, for example, a nut and bolt. An alternative means of connecting side lever spool 29 with main drive gear shaft 31 would be to use a control valve spool with an inner spline as spool 29, and to provide a shaft with an external spline as shaft 31; spool 29 and shaft 31 could then be directly connected together.

Main drive gear shaft 31 is fixedly attached to main drive gear 37 by any suitable means, such as by welding. Shaft 31 passes through a hole (not shown) in cover plate 38. Shaft 31 may freely rotate relative to cover plate 38. Low-speed, high-torque reduction gears 39, 41–45 couple main drive gear 37 to a motor gear 46. These low-speed high-torque reduction gears enable motor 47 to work under very high pressure. Main drive gear 37 meshes with pinion 39, which is fixedly attached to cogwheel 41. Cogwheel 41 meshes with pinion 42, which is fixedly attached to cogwheel 43. Cogwheel 43 meshes with pinion 44, which is fixedly attached to cogwheel 45. Cogwheel 45 meshes with motor gear 46 of reversible DC electric motor 47.

Each pinion 39, 42, 44, may be fixedly attached to its respective cogwheel 41, 43, 45, by welding, by forming them as an integral part, or by other suitable means. Cogwheels 41, 43, 45, are rotatably mounted on supports 48, 49, and 51, respectively. Supports 48, 49, and 51 are fixedly attached to lower, support plate 52. Motor gear 46 is fixedly attached to motor shaft 53.

Rods 54 support lower, support plate 52. Rods 55 support upper, cover plate 38. Rods 54 may be attached to housing 21 and lower plate 52, and rods 55 may be attached to lower plate 52 and upper plate 38, by any suitable means. Preferably, rods 54 are externally threaded at their lower ends and screwed into housing 21, and are externally threaded at their upper ends, with the upper threaded portions of rods 54 having a diameter smaller than rods 54 and passing through holes (not shown) of slightly larger diameter in lower plate 52 and upper plate 38. Rods 55 are preferably hollow (see FIGS. 3 and 4) and are welded, for example, to upper plate 38 and lower plate 52. Nuts 56 screw onto the upper threaded portion of rods 54. Should one wish to operate valve 20 manually, he need only remove nuts 56 and pin 35, and all the apparatus between upper plate 38 and lower plate 52, inclusive, can be removed. A standard handle could then be placed in side lever spool 29.

A contact board 57 (FIGS. 1, 5, and 7) is supported between main drive gear 37 by rods 58 and nuts 59. Contact board 57 has a plurality of detector contacts 60–70 (FIGS. 1, 5, 7, 8) thereon, which are electrically connected to light-emitting diodes 80–90 (FIGS. 8 and 9) via wires 110–120 (FIGS. 7, 8, and 9), respectively. Light-emitting diodes (LEDs) 80–90 are electrically connected to the positive pole 72 of battery 71 via wire 74 (FIG. 8).

Figure 6:
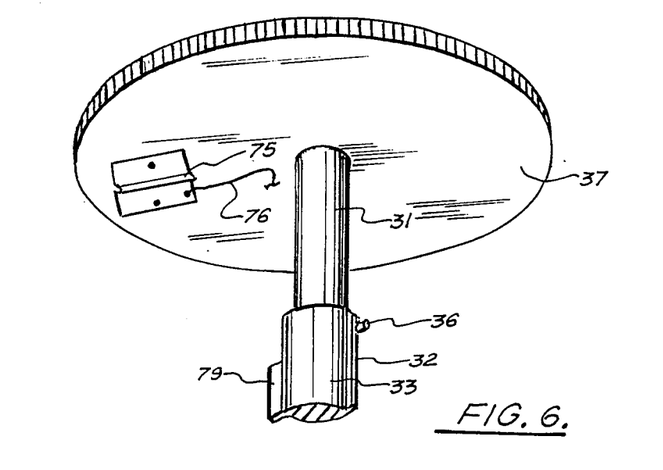
FIG. 6 is a perspective, underside view of the main driver gear shaft of the preferred embodiment of the present invention, taken along lines 6—6 in FIG. 5.
Figure 7:
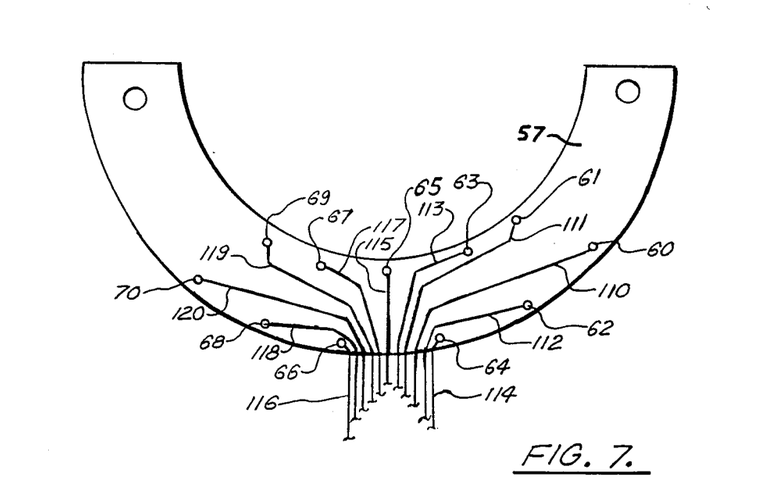
FIG. 7 is a plan view of the contact board of the preferred embodiment of the present invention, taken along lines 7—7 in 5.
Figure 8:
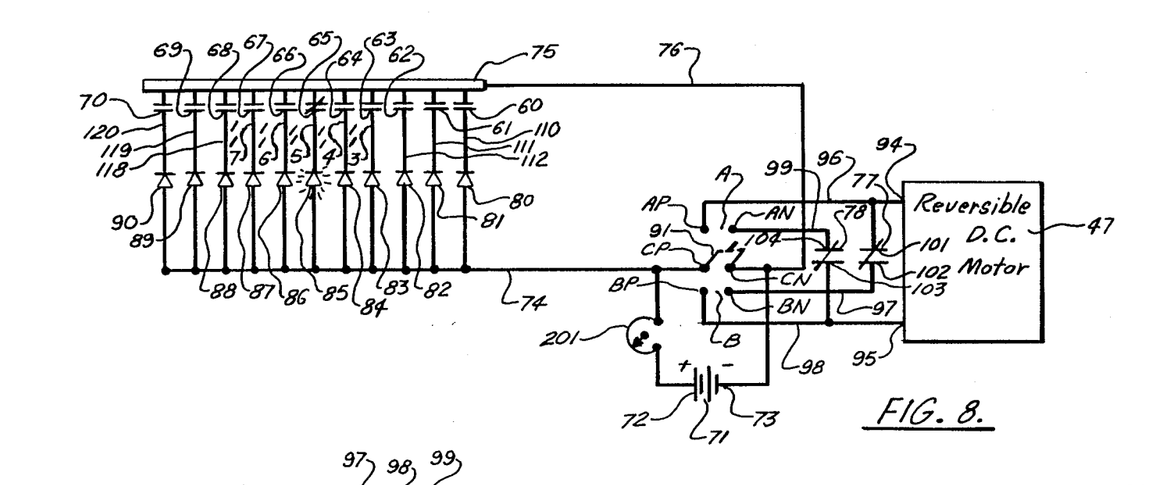
FIG. 8 is a schematic electric diagram of the apparatus of the preferred embodiment of the present invention.

A ground contact 75 (FIGS. 5, 6, and 8) is attached to the underside of main drive gear 37, and is electrically connected to the negative pole 73 of battery 71 (FIG. 8) via a wire (FIGS. 6 and 8).

Figure 3:
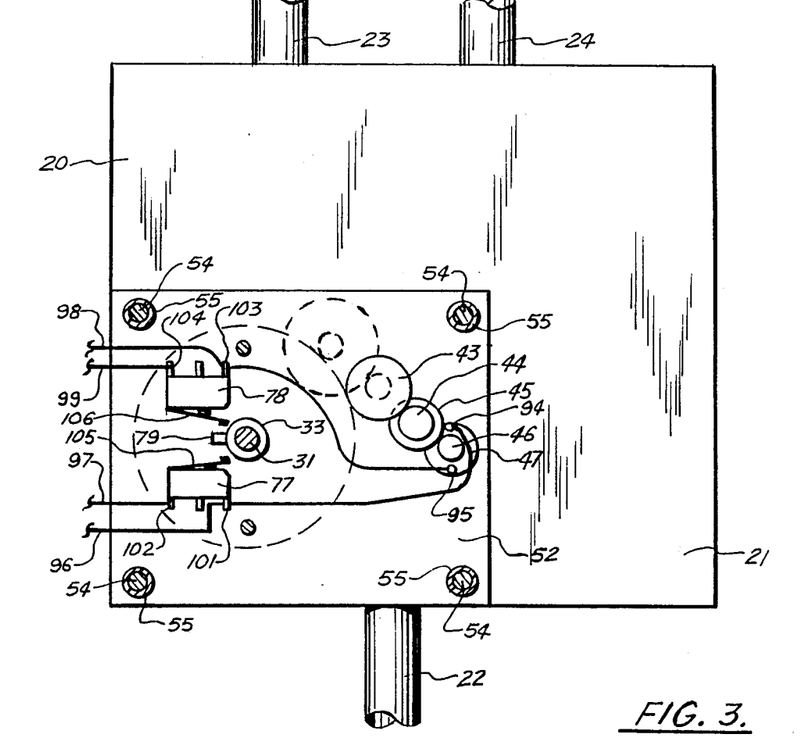
FIG. 3 is a plan view of the apparatus of the present invention taken along lines 3—3 in FIG. 1.
Figure 4:
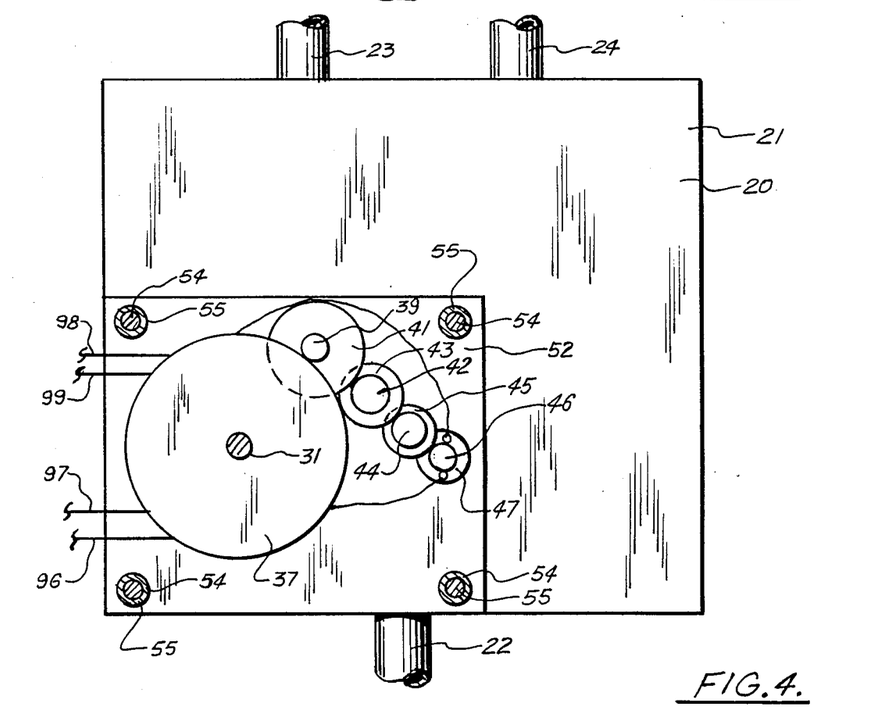
FIG. 4 is a plan view of the apparatus of the present invention taken along lines 4—4 in FIG. 1.
Figure 5:
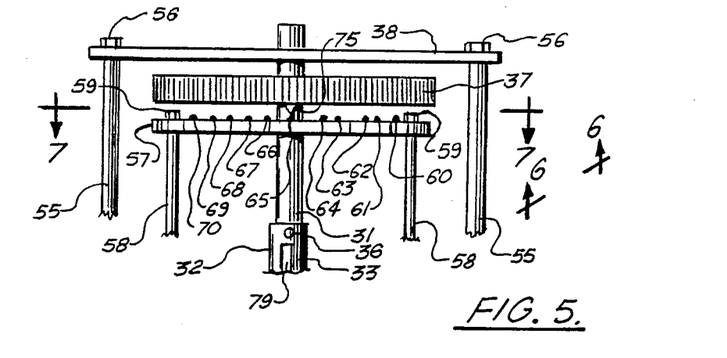
FIG. 5 is a partial front view of the apparatus of the present invention taken along lines 5—5 in FIG. 1.

Subminiature single-pole double-throw roller-lever limit switches 77 and 78 (FIGS. 1, 3, and 8) are mounted on lower, support plate 52 (FIGS. 1 and 3), near a limit switch stop 79 (FIGS. 3, 5, and 6) which is fixedly attached to upper portion 33 of connection coupling 32. Switches 77 and 78 have roller levers 105 and 106 respectively (FIG. 3). The purpose of levers 105 and 106 will be described below. A dual-pole, double-throw, spring return, center-off, six - pole switch 91 (FIG. 8) is located in control panel 92 (FIG. 9) of apparatus 100. Switch 91 is controlled by a toggle switch 93 (FIG. 9).

A first power input 94 (FIGS. 8 and 3) of reversible DC electric motor 47 is directly electrically connected to positive pole AP of side A of switch 91 via wire 96 (FIGS. 3, 8, and 9), and is electrically connected to negative pole BN of side B of switch 91 via switch 77 and wire 97 (FIGS. 3, 8, and 9). A second power input 95 (FIGS. 3 and 8) of DC motor 47 is directly electrically connected to positive pole BP of side B of switch 91 via wire 98, and is electrically connected to negative pole AN of side A of switch 91 via switch 78 and wire 99 (FIGS. 3, 8, and 9).

A first pole 101 (FIGS. 3 and 8) of switch 77 is directly connected to positive pole AP of switch 91 via wire 96. A second pole 102 (FIGS. 3 and 8) of switch 77 is directly electrically connected to negative pole BN of switch 91 via wire 97. A first 103 of switch 78 is directly electrically connected via wire 98 to positive pole VP of switch 91. A second pole 104 of switch 78 is directly electrically connected to negative pole AN of switch 91 via wire 99.

Positive center pole CP of switch 91 is electrically connected to positive pole 72 of battery 71 via a rheostat 201. Rheostat 201 is controlled by a knob 202 on control panel 92. Rheostat 201 is used to vary the speed of the opening or closing of valve 20 by varying the speed of motor 47. Negative center pole CN of switch 91 is directly electrically connected to negative pole 73 of battery 71.

In operation, if it desired to open valve 20 more fully, toggle switch 93 (FIG. 9) is pushed up and held up by the operator (not shown). This action causes pole CP of switch 91 (FIG. 8) to electrically connect with pole AP, and pole CN to electrically connect with pole AN. The current then flows from positive pole 72 of battery 71 through wire 96 to first input 94 of reversible DC electric motor 47, through motor 47, through second power input 95 of motor 47 through switch 78 and wire 99 to negative pole 73 of battery 71. This current causes motor gear 46 of motor 47 to rotate in a first direction. This rotary motion causes cogwheel 45 and pinion 44 to rotate. Rotation of pinion 44 causes cogwheel 43 and pinion 42 to rotate. Rotation of pinion 42 causes cogwheel 41 and pinion 39 to rotate. Rotation of pinion 39 causes main drive gear 37 to rotate and, with it, side lever spool 29. Rotation of side lever 29 causes valve 20 to open more fully.

Rotation of main drive gear 37 causes ground contact 75 to move. As it moves, it electrically contacts one or another of connector contacts 60-70. The corresponding LED 80-90 of a detector contact 60-70 lights up when ground contact 75 electrically contacts the detector contact 60-70, indicating on control panel 92 (FIG. 9) the degree to which valve 20 is open. For example, in FIGS. 5, 8, and 9, ground contact 75 is in electrical contact with detector contact 65. Current flows from positive pole 72 of battery 71 through wire 74, LED 85, wire 115, detector contact 65, ground contact 75, and wire 76 to negative pole 73 of battery 71, causing LED 85 to light up and indicate to the operator at control panel 92 that valve 20 is 50% open. Detector contacts 60-70 act as detecting means for detecting, and LEDs 80-90 act as indicating means for indicating, the degree to which hydraulic speed control valve 20 is open.

When the desired percentage of opening of valve 20 is reached (as indicated by LEDs 80-90 on control panel 92 (FIG. 9)), the operator lets go of toggle switch 93, allowing it to spring back into the "off" position. Poles CP and CN then electrically disconnect from poles AP and AN, respectively, stopping current flow through motor 47. Motor 47 then stops rotating and, along with it, the coupling means (gears 37-39 and 41-46, shaft 31, and connection coupling 32) between motor 47 and valve 20. Valve 20 then remains in the position in which the operator leaves it until toggle switch 93 is manipulated again.

Should the operator continue to hold toggle switch 93 up, motor 47 will continue to operate until limit switch stop 79 (FIGS. 3, 5, and 6) rotates into contact with and depresses roller lever 106 (FIG. 3) of switch 78. Depression of lever 106 causes pole 103 (FIG. 8) of switch 78 to electrically to disconnect from pole 104, which stops current from flowing through motor 47. Motor 47 thus stops and main drive gear stops rotating. At this point, ground contact 75 is in electrical contact with detector contact 70, causing LED 90 to light up, indicating to the operator that valve 20 is in the fully-open position. Switch 78 is positioned such that limit switch stop 79 depresses roller lever 106 as valve 20 fully opens, thus preventing side lever spool 29 from rotating past the fully-open position.

When it is desired to close valve 20 toggle switch 93 (FIG. 9) is pushed down and held down by the operator. When toggle switch 93 is held down, poles CP and CN of switch 91 (FIG. 8) electrically contact poles BP and BN, respectively. The current flows from positive pole 72 of battery 71, through wire 98, input 95, motor 47, input 94, switch 77, and wire 97 to negative pole 73 of battery 71. The flow of current from input 95 through motor 47 to input 94 cases motor 47 to rotate in a reverse direction from when current flows from input 94 to input 95. Motor gear 46 thus rotates in a reverse direction, as do gears 37-39 and 41-45 and side lever spool 29. Limit switch stop 79 rotates out of contact with roller lever 106 (FIG. 3) of switch 78, allowing roller lever 106 to spring back, allowing poles 103 and 104 (FIG. 8) to again electrically contact one another. As main drive gear 37 rotates, ground contact 75 moves from electrical contact with one detector contact 60-70 to another, causing the respective LED 80-90 to light up, indicating to the operator the degree to which valve 20 is open. The operator may stop valve 20 at any desired position by releasing toggle switch 93 when that position is indicated on control panel 92 by LEDs 80-90.

If he continues to hold down toggle switch 93, limit switch stop 79 will eventually come into contact with, and depress, roller lever 105 (FIG. 3) of switch 77. Depression of roller lever 105 causes pole 101 (FIG. 8) of switch 77 to electrically disconnect from pole 102, stopping the flow of current through motor 47. Motor 47 thus stops rotating, stopping the rotation of gears 37-39 and 41-46, causing side lever spool 29 to remain in the position in which it was when roller lever 105 was depressed by limit switch stop 79. Switch 77 is positioned such that limit switch stop 79 depresses roller lever 105 as valve 20 fully closes, thus preventing side lever spool 29 from rotating past the fully-closed position. When limit switch stop 79 depresses roller lever 105 of switch 77, ground contact 75 on main drive gear 37 is in electrical contact with detector contact 60, causing current to flow from positive pole 72 of battery 71, through wire 74, LED 80, wire 110, and wire 76 to negative pole 73 of battery 71. LED 80 lights up, indicating on control panel 92 that valve 20 is in the fully closed position. The operator (not shown) thus knows that motor 47 stopped because valve 20 is fully closed.

Indicator LEDs 80-90 serve not only to inform the operator of the relative degree to which valve 20 is open, but also to indicate that the apparatus 100 of the present invention is operative. When he holds toggle switch 93 up or down, and apparatus 100 is operative, ground contact 75 moves into electrical contact with one detector contact 60-70 after another, causing the respective LEDs 80-90 to light up in control panel 92. By observing consecutive LEDs 80-90 light up when he holds toggle switch 93 up or down, the operator knows that apparatus 100 is functioning properly.

Detector contacts 60-70 are preferably spaced and sized such that, when ground contact 75 moves out of electrical contact with one detector contact 60-70, ground contact immediately contacts another detector contact 60-70. Thus, one indicator LED 80-90 or another is always lit up on control panel 92.

Figure 11:
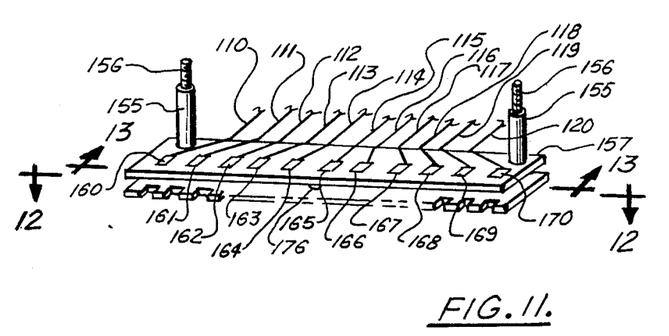
FIG. 11 is a detail of the apparatus of an alternative of the present invention.
Figure 12:
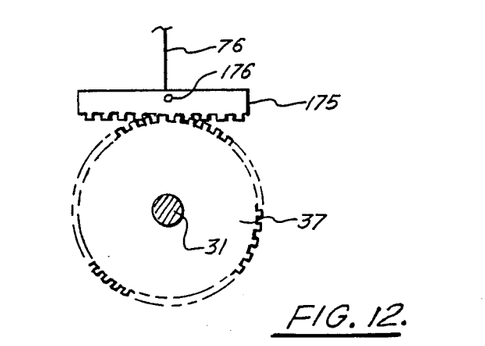
FIG. 12 is a plan view of a detail of the apparatus of the alternative embodiment of the present invention, taken along lines 12—12 in FIG. 11.
Figure 13:
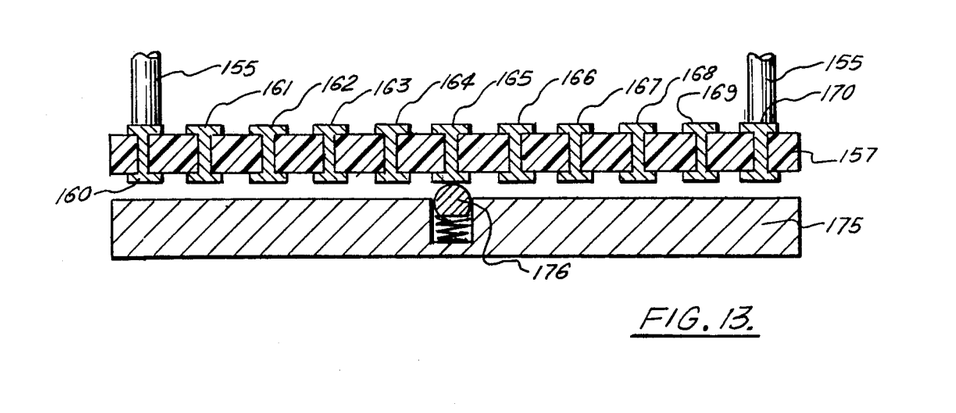
FIG. 13 is a cross-sectional view of a detail of the apparatus of the alternative embodiment of the present invention, taken along lines 13—13 in FIG. 11.

An alternative embodiment of the detector means of the present invention is shown in FIGS. 11-13.

A contact board 157 is suspended, for example, from cover plate 38 by passing the threaded portion 156 of rods 155 (FIG. 11) through holes (not shown) in cover plate 38, and securing nuts (not shown) onto the threaded portion 156 of rods 155. Contact board 157 has a plurality of detector contacts 160-170 therein. Detector contacts 160-170 extend through contact board 157 from the bottom thereof to the top (FIG. 13); wires 110-120 (FIG. 11) lead from the upper portion of detector contacts 160-170 to LEDs 80-90 (FIGS. 8 and 9), respectively.

A ground contact bar 175 has a spring-and-ball contact 176 therein. Ground contact bar 175 may be suspended from contact board 157 such that ground contact bar 175 meshes with main drive gear 37 (FIG. 12) and may freely move laterally with respect to contact board 157. Wire 76 connects spring-and-ball contact 176 to negative pole 73 of battery 71.

In operation, starting from the position shown in FIGS. 11-13, when valve 20 is being opened, main drive gear 37 rotates clockwise in the view shown in FIG. 12. Ground contact bar 175 moves to the right, and spring-and-ball contact 176 moves from electrical contact with detector contact 165 in the direction of detector contact 170. As spring-and-ball contact 176 comes into electrical contact with one of detector contacts 160-170, its respective LED 80-90 lights up on control panel 92 indicating to the operator (not shown) to what degree valve 20 is open. When valve 20 is being closed, rotation of main drive gear 37 causes ground contact bar 175 to move to the left.

While only two preferred embodiments of the present invention have been illustrated and described herein, there are numerous changes which can be made to these embodiments. For example, connection coupling 32 may be replaced with a spline coupling, and main drive gear shaft 31 and side lever spool 29 may comprise splined portions to enable them to be connected with the spline coupling. Connection coupling 32 is preferred, however, since if apparatus 100 is inoperative, one only need remove pin 36, and side lever spool 29 can be moved with a pair of pliers. An AC - to - DC converter could be used in place of battery 71. Push buttons or a rotary dial-type switch can be used in place of toggle switch 93 and dual-pole, dual-throw switch 91. Any number of indicator LEDs can be used, instead of the number shown in the drawings. Also, some other type of position-indicating means can be used, such as a meter. Limit switches 77 and 78 can be replaced by relays which energize and turn off power to motor 47 whenever the 0% or 100% LED is on. Limit switches 77 and 78 can be relocated above main drive gear 37. The coupling means between motor 47 and valve 20 can be replaced by chain couplings, a flex coupling, a jaw-type coupling, or a gear-to-gear output connection.

Ground contact 75 on main drive gear 37 can be replaced with a spring-and-ball contact placed into gear 37 either on the top side or on the bottom side of gear 37 (contact board 57 would be placed above main drive gear 37 in the former case). Additional gears can be added to increase the torque and decrease the speed if more torque is needed. Because apparatus 100 may be installed in close proximity to combustible materials, it may be contained in a box conforming to Federal safety regulations to protect apparatus 100 and to guard against personal injury.

Because of the foregoing and numerous other changes which can be made to the embodiments disclosed herein without departing from the spirit or scope of the present invention, we pray that our rights to the present invention be limited only by the following claims.

We claim:

1. An electrical control apparatus for hydraulic speed control valves, the apparatus comprising:
   (a) electrical motor means;
   (b) coupling means for coupling the motor means to a hydraulic speed control valve which is openable in varying degrees;
   (c) detecting means, for detecting the degree to which the hydraulic speed control valve is opened, comprising a plurality of electrical switches;
   (d) visual indicating means comprising electrically activated indicators for indicating, at a position remote from the valve, the degree to which the hydraulic speed control valve is opened; and
   (e) actuating means for actuating, from a position remote from the valve, the motor means, wherein the visual indicating means is located adjacent the actuating means.

2. The apparatus of claim 1, wherein:
the motor means comprises a reversible electric motor.

3. The apparatus of claim 1, wherein:
the coupling means comprises a plurality of low-speed, high-torque reduction gears.

4. The apparatus of claim 1, further comprising:
limit means for automatically controlling maximum and minimum degrees to which the valve is opened.

5. The apparatus of claim 4, wherein:
the motor means comprises a reversible electric motor; and
the limit means comprises first and second electrical switches which detect the maximum and the minimum degrees to which the valve opens, the first switch causing the motor to stop when the maximum degree is reached, the second switch causing the motor to stop when the minimum degree is reached.

6. The apparatus of claim 1, wherein:
the valve has a housing;
the motor means, coupling means, and detecting means are sized and arranged to be mounted on the housing of the hydraulic speed control valve; and
the indicating means and the actuating means are located at a location remote from the hydraulic speed control valve housing.

7. The apparatus of claim 6, wherein:
the motor means, coupling means, and detecting means, when mounted on the housing of the hydraulic control valve, do not, in plan, extend beyond the housing.

8. The apparatus of claim 1, wherein:
the indicating means indicate the degree to which the valve is opened in increments of 10%, from fully closed (0%) to fully open (100%).

9. An electrical control apparatus for hydraulic speed control valves, the apparatus comprising:
   (a) electrical motor means;
   (b) coupling means for coupling the motor means to a hydraulic speed control valve which is openable in varying degrees;

(c) detecting means for detecting the degree to which the hydraulic speed control valve is opened;
(d) visual indicating means for indicating, at a position remote from the valve, the degree to which the hydraulic speed control valve is opened; and
(e) actuating means for actuating, from a position remote from the valve, the motor means, wherein:
the visual indicating means is located adjacent the actuating means;

the detecting means comprises a plurality of normally open electrical switches; and
the indicating means comprises electrically activated indicators.

10. The apparatus of claim 9, wherein:
the indicators comprise light-emitting diodes.

11. The apparatus of claim 9, wherein:
the indicators indicate the degree to which the valve is opened in increments of 10%, from fully closed (0%) to fully open (100%).

* * * * *